United States Patent [19]

Satoh

[11] Patent Number: 4,892,013
[45] Date of Patent: Jan. 9, 1990

[54] VARIABLE SPEED GEARING IN ROTARY ELECTRIC TOOL

[75] Inventor: Atsushi Satoh, Saitama, Japan

[73] Assignee: Olympic Co. Ltd., Iruma, Japan

[21] Appl. No.: 213,156

[22] Filed: Jun. 29, 1988

[30] Foreign Application Priority Data

Jul. 30, 1987 [JP] Japan ............................... 62-190587

[51] Int. Cl.[4] ............................................. F16H 3/74
[52] U.S. Cl. ...................................... 74/785; 74/751; 173/12
[58] Field of Search ...................... 74/785, 751, 752 B; 143/12

[56] References Cited

U.S. PATENT DOCUMENTS

| 2,884,814 | 5/1959 | Schott ................... | 74/785 |
| 3,295,394 | 1/1967 | Whateley ............. | 74/785 X |
| 3,960,035 | 6/1976 | Workman, Jr. et al. ............. | 74/785 |
| 4,215,594 | 8/1980 | Workman, Jr. et al. ............. | 74/751 |
| 4,513,827 | 4/1985 | Dubiel ................... | 173/12 |
| 4,614,134 | 9/1986 | Bohle ................... | 173/12 X |
| 4,738,163 | 4/1988 | Anderson et al. ................. | 74/785 |

FOREIGN PATENT DOCUMENTS 59-15764  4/1984  Japan .

Primary Examiner—Leslie A. Braun
Assistant Examiner—William Gehris
Attorney, Agent, or Firm—Sandler & Greenblum

[57] ABSTRACT

A variable speed gearing apparatus for a rotary electric tool, including a differential gear mechanism for being mounted within a gear case, an intermediate gear and a clutch mechanism, a final planetary gear mechanism having internal gear with projections formed on the outer peripheral surface of the internal gear in the differential gear mechanism, a torque-setting cam arranged so that said projections of the internal gear of the final planetary gear mechanism are capable of being engaged with and disengaged from the torque-setting cam a first planetary gear mechanism having an internal gas, wherein the outer peripheral surface of the internal gear of the first planetary gear mechanism in the differential gear mechanism is tapered, a brake disk having a tapered surface corresponding to the tapered surface of the internal gear of the first planetary gear mechanism, the brake disk being arranged to be axially movable to be brought into pressure contact through the tapered surface of the brake disk with the tapered surface of the internal gear of the first planetary gear mechanism movably in a rotation-stopped condition, the brake disk being arranged so that it can be interlocked against axial movement with respect to the internal gear of the final planetary gear mechanism.

20 Claims, 6 Drawing Sheets 4,892,013

VARIABLE SPEED GEARING IN ROTARY ELECTRIC TOOL

BACKGROUND OF THE INVENTION

1. Field of the Invention:

The present invention relates to a variable speed gearing in a rotary electric tool such as a motor-driven screw-driver or drill.

2. Prior Art:

In conventional motor-driven screw-drivers and drills, the rotation of a terminal output shaft is generally varied between high and low speeds by changing the combination in the number of teeth of spur gears. An example is as disclosed in Japanese Patent Publication No. 15764/1984. In such conventional devices, however, the change of speed is performed manually using a speed changing handle, so that there is the inconvenience that the change over operation must be done during the rotation of the shaft.

More particularly, when the load exerted on the tool in use becomes large and the rotation stops, the speed is changed to low by operating the speed changing handle to increase the tightening torque. The degree of rotation of the tool is checked visually or is sensed by the hands of the user who holds the tool, and the speed is changed manually according to the thus-confirmed condition.

SUMMARY OF THE INVENTION

The present invention has been effected in view of the conventional circumstances mentioned above and it is the object thereof to eliminate the inconvenience that the user is required to sense an increase or decrease of the load exerted on the rotating tool and then change the speed according to the sensed condition.

The technical means adopted by the present invention for overcoming the above problem is characterized in that a differential gear mechanism is mounted within a gear case which is fixed to a housing, for example; that in order to attain the same rotating direction of both input and output shafts of the differential gear mechanism, an intermediate gear and a clutch mechanism provide that projections are formed on the outer peripheral surface of an internal gear of a final planetary gear mechanism in the differential gear mechanism so that the projections are capable of being engaged with and disengaged from a torque setting cam; that the outer peripheral surface of an internal gear of a first planetary gear mechanism in the differential gear mechanism is tapered; and that an axially movable brake disk having a tapered surface corresponding to the tapered surface of the internal gear of the said first planetary gear mechanism is brought into pressure contact through the tapered surface thereof with the tapered surface of the internal gear just mentioned to maintain the internal gear against rotation the brake disk being constructed so that it can be interlocked with axial movement of the internal gear of the final planetary gear mechanism.

The spring force for pressing the brake disk which makes a change-over control between lock and rotation for the internal gear of the first planetary gear mechanism in the differential gear mechanism may be set at a predetermined pressure or it may be made adjustable between strong and weak from the exterior. In the latter case, the axial movement of the brake disk may be locked at the final stage of strong and the brake disk may be spaced from the internal gear at the beginning of weak.

According to the above means, when the load is small within the preset torque range, only the inner output shaft out of the inner and outer output shafts of the differential gear mechanism operates and it rotates at high speed, and when the load increases during that rotation, the change-over means functions to operate and synchronize the inner and outer output paths so that decelerated rotation is transmitted to the driving output shaft.

The change-over between high and low speeds is effected by engagement and disengagement of the brake disk with respect to the tapered outer peripheral surface of the internal gear of the first planetary gear mechanism in the differential gear mechanism, the brake disk being held in pressure contact with the said tapered surface by virtue of spring force. Consequently, the change-over from high to low speed is smoothly and steplessly effected. Further, in the case where the axial movement of the brake disk is prevented by adjusting the spring force, the high speed rotation continues without changing over to a low speed rotation because the rotation of the internal gear is stopped completely. Conversely, when the spring force is weakened and the brake disk disengaged from the internal gear forcibly, the internal gear rotates to provide a rotational condition at low speed.

BRIEF DESCRIPTION OF THE DRAWINGS

FIGS. 7 to 12 illustrate an embodiment provided with an adjusting means, of which:

FIG. 7 is a sectional view in a rotating condition at high speed;

FIG. 8 is a sectional view taken along line (8)—(8) of FIG. 7;

FIG. 9 is a front view showing an engaged condition of an adjusting lever and a base plate;

FIG. 10 a sectional view in a changed-over condition to low speed rotation;

FIG. 11 is a sectional view in a rotating condition at high speed, including a modified form of adjusting means; and FIG. 12 is a sectional view in a changed-over condition to low speed rotation.

DESCRIPTION OF PREFERRED EMBODIMENTS

Figure 1:
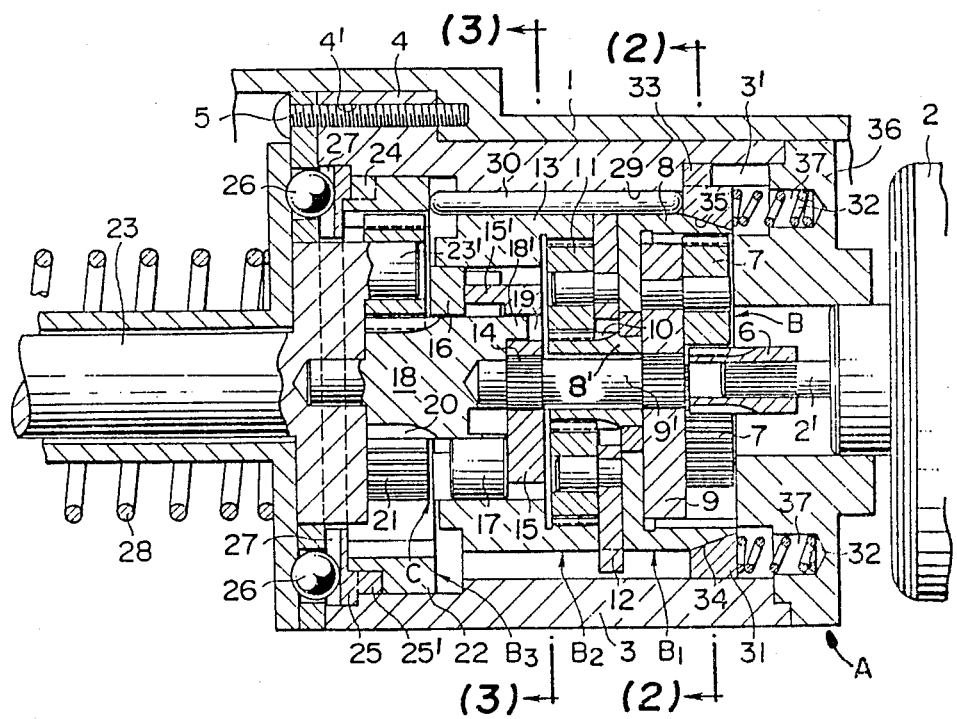
FIG. 1 is a sectional view of a variable speed gearing according to an embodiment of the present invention, which is in a rotating condition at high speed.
Figure 2:
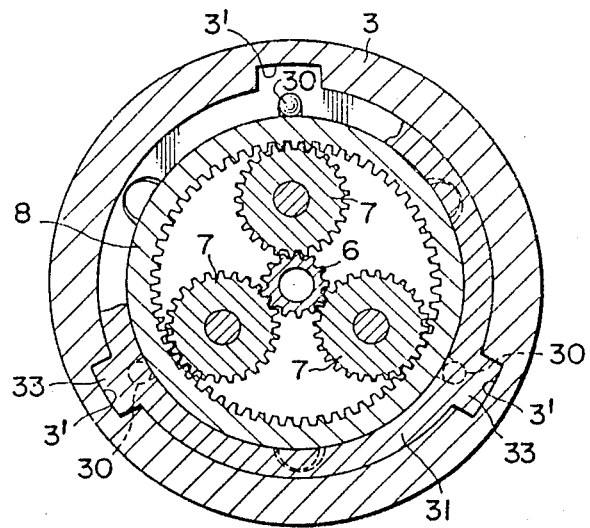
FIG. 2 a sectional view taken along line (2)—(2) of FIG. 1.
Figure 3:
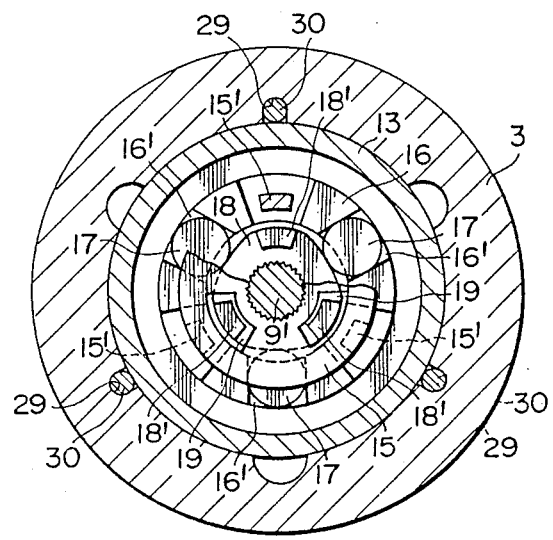
FIG. 3 is a sectional view taken along line (3)—(3) of FIG. 1.
Figure 4:
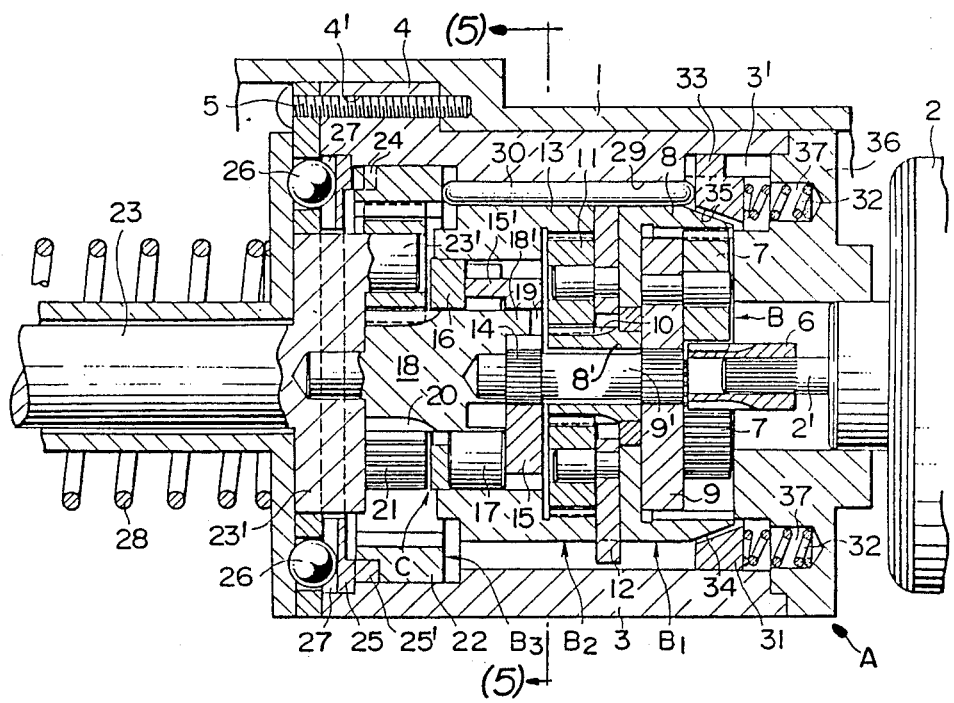
FIG. 4 is a sectional view of the variable speed gearing which is in a changed-over condition to low speed rotation.
Figure 5:
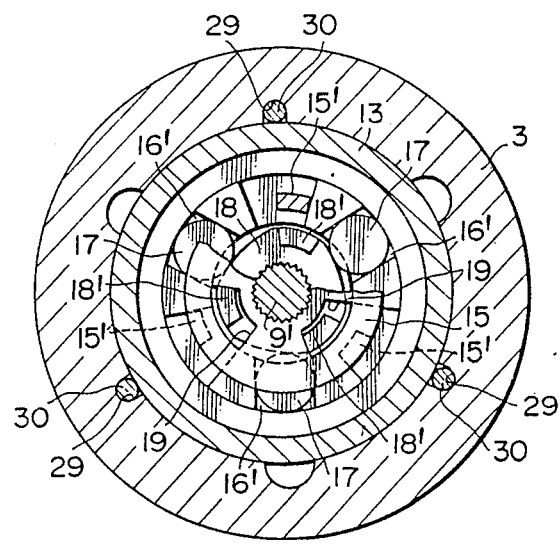
FIG. 5 is a sectional view taken along line (5)—(5) of FIG. 4.
Figure 6:
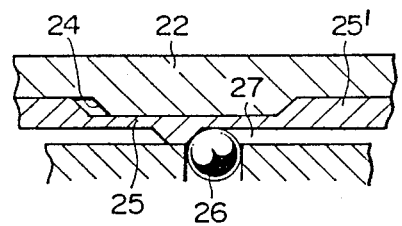
FIG. 6 is a developed sectional view showing an engaged condition of a torque setting cam and an internal gear.
Figure 7:
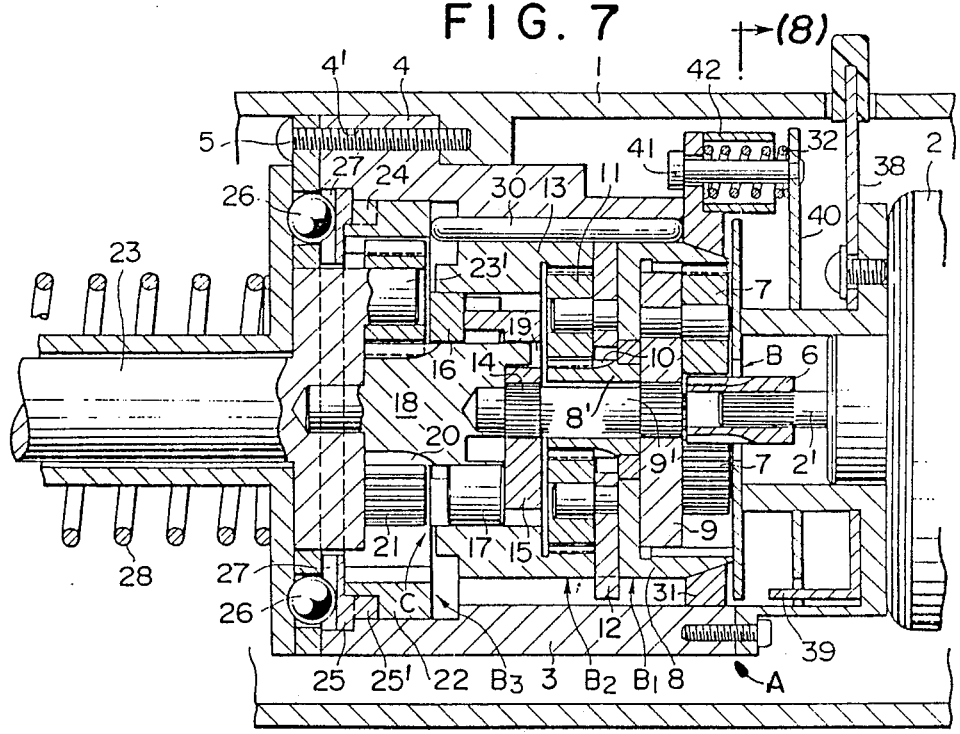
Figure 8:
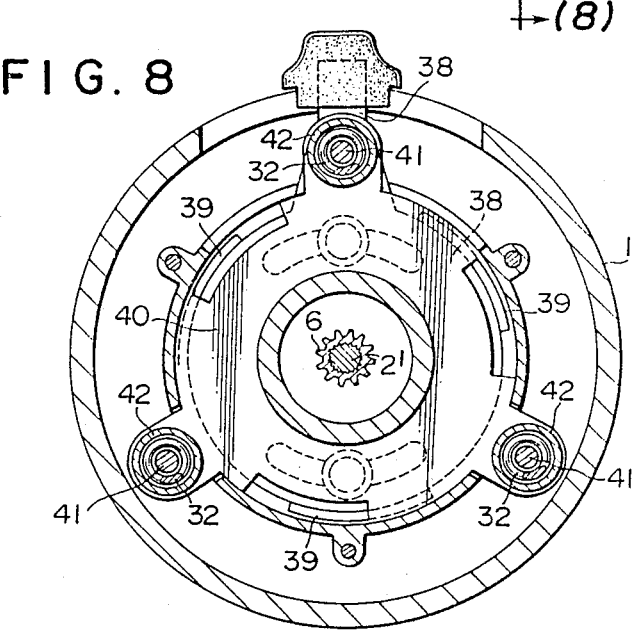
Figure 9:
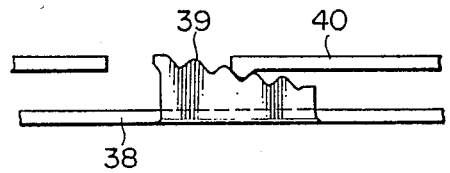
Figure 10:
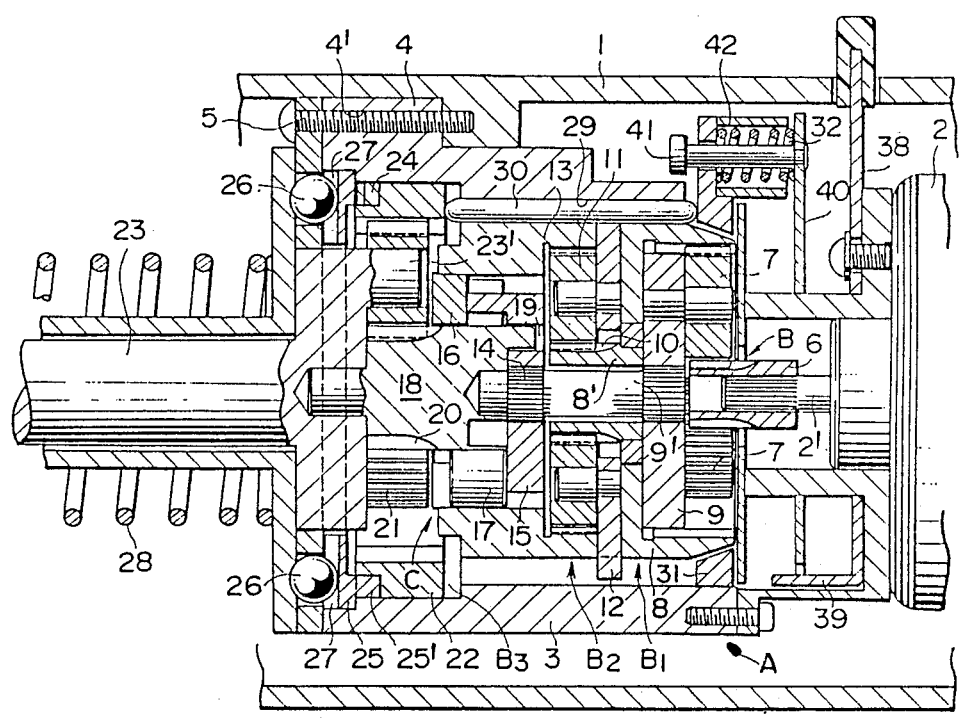

A variable speed gearing including a change-over means which utilizes a torque setting cam, according to an embodiment of the present invention, will be described hereinafter with reference to the accompanying drawings.

Numeral 1 denotes a housing of a motor-driven drill or screw-driver. In front of a motor 2 mounted fixedly in the housing 1 is provided a variable speed gearing A for changing the number of revolutions per minute of output shaft 23. The variable speed gearing A is composed of a gear case 3 and a differential gear mechanism B mounted within the case 3. The gear case 3 is in the form of a cylinder having open ends. The outer peripheral surface thereof is formed with plural mounting lugs 4 each having a machine screw insertion hole 4', and the gear case 3 is fixed to the housing 1 with machine screws 5 through the insertion holes 4'.

The differential gear mechanism B mounted inside the gear case 3 is composed of three stages of planetary gear mechanisms $B_1$, $B_2$ and $B_3$. Planetary gears 7 in the first-stage planetary gear mechanism $B_1$ are in mesh with a pinion 6 which is fixed onto a rotative input shaft 2' of the motor 2, whereby the rotation of the motor is input to the differential gear mechanism B.

The first planetary gear mechanism $B_1$ is composed of three planetary gears 7, an internal gear 8 meshing with the planetary gears 7, and a support plate 9 which supports the planetary gears 7. A shaft 9' is fixed integrally to the center of the support plate 9 to support not only a cylindrical shaft portion 8' of the internal gear 8 but also the second planetary gear mechanism $B_2$.

The second or intermediate planetary gear mechanism $B_2$ is composed of four planetary gears 11 which are in mesh with a sun gear 10 formed on the outer peripheral surface of the cylindrical shaft portion 8' of the internal gear 8 in the first planetary gear mechanism $B_1$, a support plate 12 which supports the planetary gears 11, and an intermediate internal gear 13 meshing with the planetary gears 11. Inside the internal gear 13 is disposed a clutch mechanism C which transmits the rotation to the third planetary gear mechanism $B_3$.

The clutch mechanism C comprises a change-over cam 15 engaged with a toothed portion 14 of the shaft 9' in the first planetary gear mechanism $B_1$, a retainer 16 fitted inside the internal gear 13, lugs 15' of the change-over cam 15, rollers 17 fitted in recesses 16' of the retainer 16, and a change-over shaft 18 fitted in a hole of the retainer 16 and adapted to be engaged with and disengaged from the peripheral surface of the rollers 17, the change-over shaft 18 having a section which has a generally triangular shape with rounded corners. The change-over cam 15 is formed with arcuate grooves 19 at an angle of 60° in trisected positions of the circumference, and pawls 18' projecting from a side end face of the change-over shaft 18 are fitted in and engaged with the arcuate grooves 19, so that the shaft 18 rotates in interlock with the rotation of the change-over cam 15. The projecting pawls 18' are set at an angle (40°) smaller than that of the arcuate grooves 19 so that there occurs discrepancy in operation between the two.

The third planetary gear mechanism $B_3$, which is operated by a sun gear 20 formed on the outer peripheral surface of the front portion of the change-over shaft 18 in the clutch mechanism C, is composed of three planetary gears 21 meshing with the sun gear 20, an internal gear 22 meshing with the planetary gears 21, and a driving output shaft 23 integral with a support plate 23' which supports the planetary gears 21. On the outer peripheral surface of the internal gear 22 are formed projections 24 of a trapezoidal section at equal intervals in the circumferential direction, and a torque setting cam 25 having projections 25' adapted to be engaged with and disengaged from the projections 24 is fitted in the front portion of the gear case 3. Further, recesses 27 for fitting therein of balls 26 are formed in the face of the torque setting cam 25 on the side opposite to the side where the projections 25' are formed. The force of a spring 28, whose biasing force is varied by turning of a torque adjusting knob (not shown), is exerted on the torque setting cam 25 through the balls 26. More specifically, within the range of a torque which has been set by turning the torque adjusting knob, the internal gears 22 and the torque setting cam 25 are engaged with each other to prevent the rotation of the internal gears 22, while when a load exceeding the preset torque is imposed on the driving output shaft 23, the internal gear 22 meshing with the planetary gears 21 rotates and is pushed out backward (rightward in the drawing) beyond the projections 25' of the torque setting cam 25.

The axial movement of the internal gear 22 which operates upon detection of an increase or decrease of the load relative to the preset torque causes backward movement of slide pins 30 fitted in slots 29 formed inside the gear case 3, whereby the gear case 3 and the internal gear 8 in the first planetary gear mechanism $B_1$ are engaged and connected with each other, to push a brake disk 31, which has stopped the rotation of the internal gear 8, backward (toward the motor) against the biasing force of a spring 32 until it becomes disengaged from the internal gear 8, thereby permitting rotation of the internal gear 8.

The brake disk 31, which is a doughnut-like disk, is provided on its outside with engaging lugs 33 fitted in and engaged with retaining recesses 3' of the gear case 3, and provided on its inside with a tapered surface 35 corresponding to a tapered outer peripheral surface 34 of the internal gear 8.

Further, springs 32 for urging the brake disk 31 in the direction of engagement with the gear case 3 and the internal gear 8 are mounted within mounting holes 37 formed in the front face of a motor base 36.

The operation of the above variable speed gearing will now be explained. In a load condition smaller than the preset torque value, the rotation of the rotative shaft 2' of the motor 2 is transmitted as follows: pinion gear 6 (forward rotation)→planetary gears 7 (reverse rotation)→support plate 9 (shaft 9') (forward rotation)→change-over cam 15→change-over shaft 18 (sun gear 20)→planetary gears 21→support plate 23'→driving output shaft 23, whereby a drill or a screw tightening tool connected to the driving output shaft is rotated. Thus a so-called high speed rotation of output shaft 23 is performed.

During the above-mentioned high speed rotation, when the load on the tool increases to a level exceeding the preset torque at the final screwing stage, the speed of rotation of the driving output shaft 23 connected with the tool decreases, while the planetary gears 21 continue to rotate in their normal positions so that the internal gear 22 meshing with the planetary gears 21 is rotated and moves in the axial direction (rightward in the drawing) to get over the projections 25' of the torque setting cam 25, whereby the slide pins 30 are forced out backward to push the brake disk 31 backward against the biasing force of the springs 32 and disengage it from the tapered surface 34 of the internal gear 8. As a result, the rotation of the rotative shaft 2' of the motor 2 is transmitted as follows:

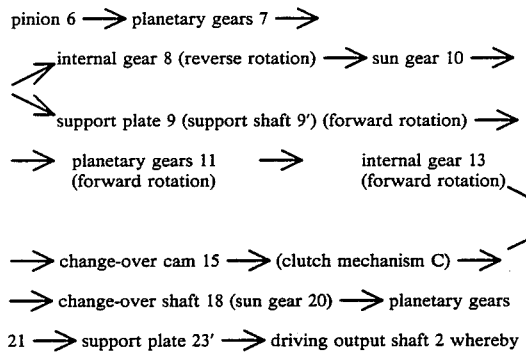

whereby the rotation of the driving output shaft is decelerated and the torque increases. At this time, the second planetary gear mechanism B₂ functions to cause the first-stage internal gear 8 to return from reverse to forward rotation and at the same time decelerate it. As a result of rotation of the intermediate internal gear 13 in the second planetary gear mechanism B₂, the retainer 16 which holds the rollers 17 is also rotated in the same direction by virtue of friction, so that the rollers 17 are stuck wedgewise between the internal gear 13 and the change-over shaft 18 to make the gear 13 and the shaft 18 integral with each other.

Further, although the brake disk 31 is engaged with and disengaged from the internal gear 8 of the first planetary gear mechanism B₁ by automatic change-over operation using a cam i.e. torque-setting cam 25 according to an increase or decrease of the load exerted on the terminal output portion, an optional selection may be made between the state in which the brake disk is kept retained from the exterior and the state in which it is forcibly kept disengaged, thereby permitting selection between high and low speed rotational conditions.

Referring now to FIGS. 7 to 12, there is illustrated a variable speed gearing provided with an adjusting means according to another embodiment of the present invention. In this embodiment, the same components as in the previous embodiment will be indicated by the same reference numerals and the explanations thereof omitted.

Referring first to FIGS. 7 to 10, a rotary adjusting lever 38 is mounted near the brake 31. The adjusting lever 38, which is doughnut-shaped, has a plurality of projections 39 formed stepwise on the outer peripheral edge thereof at equal intervals in the circumferential direction. On the other hand, guide rods 41 are mounted projectingly on the circumference of a base plate 40 which is carried on the projections 39, the fore ends of the guide rods 41 projecting through the brake disk 31 and being each formed with an enlarged head portion. Further, a spring 32 is mounted in a compressed state outside each guide rod 41 in a position between the base plate 40 and the brake disk 31, and a sleeve 42 is fixed to the brake disk 31 in a surrounding relation to the spring 32.

In such construction, when the adjusting lever 38 is turned to push up the base plate 40 through the projections 39, the biasing force (spring force) of the spring 32 is enhanced and the axial movement of the brake disk 31 is prevented upon abutment of the base plate 40 with the sleeve 42, so that the rotational condition at high speed is maintained. Conversely, where the base plate 40 is supported by the bottom portions of the projections 39, the biasing force of the spring 32 is weakened because the spacing between the base plate 40 and the brake disk 31 becomes wider, so that the head portions of the guide rods 41 engage the brake disk 31 and cause the latter to move axially away from the internal gear 8, thus permitting rotation of the internal gear. Consequently, the output shaft 23 continues to rotate at low speed.

Figure 11:
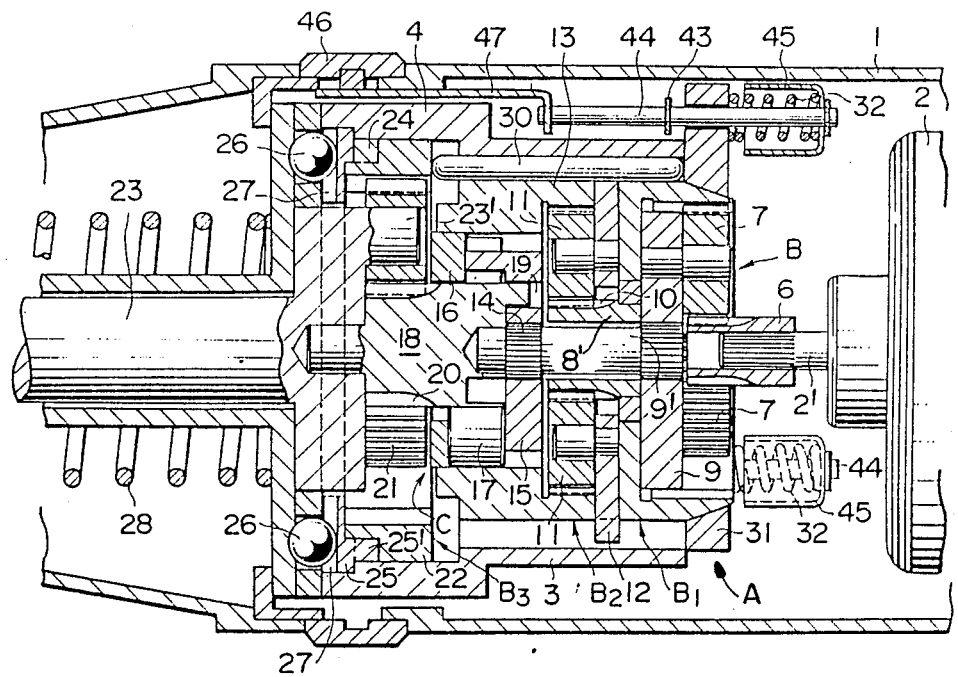
Figure 12:
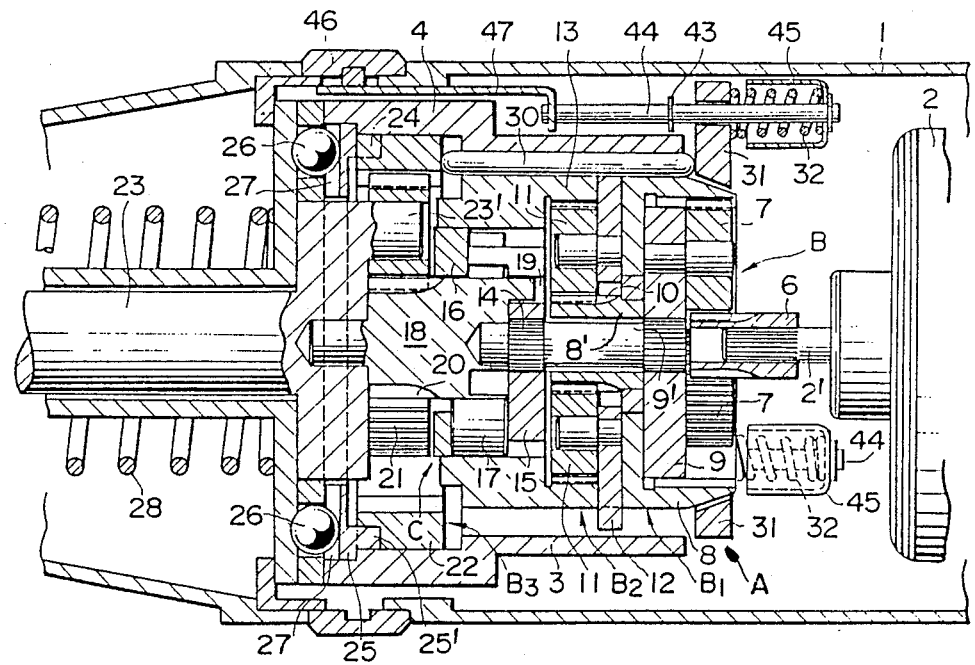

In FIGS. 11 and 12, an adjusting means is positioned in front of the brake disk 31. A plurality of shafts 44 each having a stopper 43 are inserted through the brake disk 31 and a cap 45 is fixed to the end portion of each shaft 44 projecting behind the brake disk 31. Further, a spring 32 is mounted in a compressed state between the bottom of the cap 45 and the rear face of the brake disk 31. The opposite end of each shaft 44 is connected to an end of a connecting rod 47 which slides axially with turning motion of an adjusting knob 46.

In the above construction, when the adjusting knob 46 is turned to let the shafts 44 move forward (leftward in the drawing), the springs 32 are pressed and so their biasing force is enhanced. Conversely, the biasing force of the springs 32 is weakened by backward (rightward in the drawing) movement of the shafts 44. And when the front ends of the caps 45 are in abutment with the back of the brake disk 31, the axial movement of the brake disk 31 is prevented, so that the output shaft rotation is maintained at high speed. When the brake disk 31 is pushed backward away from the internal gear 8 forcibly by the stoppers 43 of the shafts 44, the internal gear 8 becomes rotatable, so that the output shaft rotation is maintained at low speed.

Since the variable speed gearing of the present invention is constructed as above, the inner and outer output systems of the differential gear mechanism rotate synchronously or each independently according to increase or decrease of the load imposed on the terminal output portion, resulting in that the rotation of the terminal output portion is changed over between high and low speed rotational conditions. Besides, the lock/rotation control for the internal gear of the first planetary gear mechanism in the differential gear mechanism which functions to change over between high and low speed rotational conditions, is effected through pressure contact of the tapered surface of the axially movable brake disk with tapered outer peripheral surface of the said internal gear. Therefore, the engagement and disengagement of the axially moving brake disk with respect to the internal gear according to increase or decrease in load relative to a preset torque value are smoothly and steplessly effected, thus permitting smooth change-over from high to low speed. Further, by the adjusting means for adjusting the biasing force of the springs which urge the brake disk against the internal gear, the brake disk can be locked in engagement with the internal gear, or when it is held in a completely spaced condition, it is possible to maintain the rotation at high or low speed. Thus, selection can be made optionally according to the state of use. Consequently, it becomes possible to constitute a rotary electric tool superior in utility.

What is claimed is:

1. A variable speed gearing apparatus for a rotary electric tool, comprising a differential gear mechanism mountable within a gear case, an intermediate gear and a clutch mechanism, a final planetary gear mechanism having an internal gear with projections formed on the outer peripheral surface of said internal gear in said differential gear mechanism, a torque-setting cam arranged so that said projections of said internal gear of said final planetary gear mechanism are capable of being engaged with and disengage from said torque-setting cam, a first planetary gear mechanism having an internal gear, wherein the outer peripheral surface of said internal gear of said first planetary gear mechanism in said differential gear mechanism is tapered, a brake disk having a tapered surface corresponding to said tapered surface of said internal gear of said first planetary gear mechanism, said brake disk being arranged to be axially movable to be brought into pressure contact through said tapered surface of said brake disk with said tapered surface of said internal gear of said first planetary gear mechanism, and means for connecting said brake disk for axial movement with said internal gear of said final planetary gear mechanism.

2. A variable speed gearing apparatus according to claim 1, wherein said brake disk is urged in the direction of engagement with said internal gear of said first planetary gear mechanism by virtue of a spring, the biasing force of said spring being adjustable to permit the brake disk to be locked in engagement with said internal gear of said first planetary gear mechanism or separated therefrom.

3. A variable speed gearing apparatus according to claim 1, wherein said brake disk is adapted to be movable with respect to the gear case and is adapted to be engaged with and disengaged from said internal gear of said first planetary gear mechanism.

4. A variable speed gearing apparatus according to claim 3, wherein the engagement and disengagement of said brake disk are effected by an automatic change-over operation using a cam according to an increase or decrease of the load exerted on the terminal output portion.

5. A variable speed gearing apparatus according to claim 1, wherein there is further provided an adjusting means in the vicinity of said brake disk.

6. A variable speed gearing apparatus according to claim 5, wherein said adjusting means is a rotary adjusting lever.

7. A variable speed gearing apparatus according to claim 6, wherein said adjusting lever is doughnut-shaped and has a plurality of projections formed stepwise on the outer peripheral edge thereof at equal intervals in the circumferential direction.

8. A variable speed gearing apparatus according to claim 5, wherein said adjusting means is positioned in front of said brake disk.

9. A variable speed gearing apparatus according to claim 1, in combination with said gear case within which said differential gear mechanism is mounted, said gear case being fixed relative to a housing.

10. A variable speed gearing apparatus according to claim 1, further comprising an electric motor having a driving shaft for said output shaft, and wherein said apparatus is configured and arranged such that said driving shaft and said output shaft maintain their same respective directions of rotation during changes in speed of rotation of said output shaft.

11. A variable speed gearing arrangement comprising:
(a) a gear case having a longitudinal axis;
(b) an axially movable brake disk;
(c) a first planetary gear mechanism to be operably connected to a driving shaft, said first planetary gear mechanism including an internal gear having a surface which is engageable with said axially movable brake disk to maintain said internal gear against rotation during such engagement;
(d) means for biasing said brake disk against said internal gear of said first planetary gear mechanism for engagement therewith;
(e) a final planetary gear mechanism to be operably connected to an output shaft, said final planetary gear mechanism including an axially movable internal gear having an outer periphery, said movable internal gear having projections located on said outer periphery;
(f) a torque-setting cam for engagement with said internal gear of said final planetary gear mechanism by means of said projections of said internal gear of said final planetary gear mechanism to maintain said movable internal gear against axial movement; and
(g) means for moving said brake disk in opposition to said means for biasing said brake disk, in response to movement of said movable internal gear of said final planetary gear mechanism, to separate said brake disk from said surface of said internal gear of said first planetary gear mechanism.

12. The arrangement of claim 11 wherein said internal gear of said first planetary gear mechanism is arranged for rotation relative to said gear case upon separation of said brake disk therefrom, said arrangement further comprising an intermediate planetary gear mechanism and a clutch mechanism to maintain the same direction of rotation of said output shaft upon rotation of said internal gear of said first planetary gear mechanism.

13. The arrangement of claim 11 wherein said means for moving said brake disk in opposition to said means for biasing said brake disk comprises a plurality of axially movable slide pins extending between said internal gear of said final planetary gear mechanism and said brake disk.

14. The arrangement of claim 11 further comprising means for adjusting the biasing force of said means for biasing said brake disk against said internal gear of said first planetary gear mechanism.

15. The arrangement of claim 14, wherein said means for adjusting comprises a manually movable lever operably associated with said means for biasing said brake disk against said internal gear of said first planetary gear mechanism.

16. The arrangement of claim 11 further comprising means for biasing said torque-setting cam against said movable internal gear of said final planetary gear mechanism to permit movement of said movable internal gear only in response to a predetermined torque being applied to said output shaft.

17. The arrangement of claim 11 further comprising means for automatically effecting a change in the speed of rotation of said output shaft.

18. The arrangement of claim 11, further comprising means for manually effecting a change in the speed of rotation of said output shaft.

19. The arrangement of claim 18, wherein said means for manually effecting a change in the speed of rotation of said output shaft comprises means for manually effecting a separation of said brake disk from said internal gear of said first planetary gear mechanism.

20. A rotary electric tool comprising the arrangement of claim 11.

* * * * *